(12) United States Patent
Matsuura et al.

(10) Patent No.: US 9,839,916 B2
(45) Date of Patent: Dec. 12, 2017

(54) WET-TYPE ELECTRIC DUST COLLECTION DEVICE AND DUST REMOVAL METHOD

(71) Applicant: MITSUBISHI HEAVY INDUSTRIES MECHATRONICS SYSTEMS, LTD., Hyogo-ku, Kobe-shi, Hyogo (JP)

(72) Inventors: Kenji Matsuura, Kobe (JP); Shiro Suzuki, Kobe (JP); Tooru Nishiyama, Kobe (JP); Mitsuaki Nishitani, Kobe (JP); Yasutoshi Ueda, Kobe (JP)

(73) Assignee: MITSUBISHI HITACHI POWER SYSTEMS ENVIRONMENTAL SOLUTIONS, LTD., Kanagawa (JP)

( * ) Notice: Subject to any disclaimer, the term of this patent is extended or adjusted under 35 U.S.C. 154(b) by 193 days.

(21) Appl. No.: 14/406,643

(22) PCT Filed: Jul. 19, 2013

(86) PCT No.: PCT/JP2013/069664
§ 371 (c)(1),
(2) Date: Dec. 9, 2014

(87) PCT Pub. No.: WO2014/014090
PCT Pub. Date: Jan. 23, 2014

(65) Prior Publication Data
US 2015/0182975 A1     Jul. 2, 2015

(30) Foreign Application Priority Data

Jul. 20, 2012 (JP) .................................. 2012-161464

(51) Int. Cl.
*B03C 3/16* (2006.01)
*B03C 3/38* (2006.01)
(Continued)

(52) U.S. Cl.
CPC .................. *B03C 3/16* (2013.01); *B03C 3/017* (2013.01); *B03C 3/38* (2013.01); *B03C 3/41* (2013.01);
(Continued)

(58) Field of Classification Search
CPC combination set(s) only.
See application file for complete search history.

(56) References Cited

U.S. PATENT DOCUMENTS 3,785,118 A    1/1974 Robertson
4,126,434 A    11/1978 Keiichi
(Continued)

FOREIGN PATENT DOCUMENTS

JP    49-119274 A    11/1974
JP    5384274 A    7/1978
(Continued)

OTHER PUBLICATIONS

International Search Report dated Oct. 22, 2013 in International Application No. PCT/JP2013/069664 filed Jul. 19, 2013.
(Continued)

*Primary Examiner* — Duane Smith
*Assistant Examiner* — Sonji Turner
(74) *Attorney, Agent, or Firm* — Kanesaka Berner and Partners LLP

(57) ABSTRACT

A wet-type electric dust collection device and low-concentration $SO_3$ mist containing, in which the wet-type electric dust collection device has an electrical field formation part in which a plurality of discharge electrodes are provided on opposing surfaces of a first electrode and second electrodes for forming a DC electrical field. The discharge electrodes of the first electrode and the discharge electrodes of the second electrodes generate corona discharges that are reversed in polarity relative to each other. The gas containing the $SO_3$
(Continued)

mist and the dust is guided to the electrical field formation part without electrically charging the $SO_3$ mist and the dust or spraying a dielectric in the gas, and while the gas flows between the electrodes, the corona discharges impart electric charges of alternately reversed polarity to the $SO_3$ mist and the dust. The first electrode and the second electrodes collect the charged $SO_3$ mist and dust.

5 Claims, 7 Drawing Sheets

(51) Int. Cl.
    B03C 3/74     (2006.01)
    B03C 3/68     (2006.01)
    B03C 3/41     (2006.01)
    B03C 3/017    (2006.01)
    B03C 3/78     (2006.01)
    B01D 53/32    (2006.01)

(52) U.S. Cl.
    CPC ............... B03C 3/68 (2013.01); B03C 3/74 (2013.01); B03C 3/78 (2013.01); B01D 53/323 (2013.01); B01D 2257/302 (2013.01); B03C 2201/10 (2013.01)

(56) References Cited

U.S. PATENT DOCUMENTS

| | | | |
|---|---|---|---|
| 4,381,927 A | 5/1983 | Noll | |
| 5,037,456 A | 8/1991 | Yu | |
| 5,902,380 A * | 5/1999 | Tomimatsu | B01D 53/504 95/71 |
| 6,500,240 B1 * | 12/2002 | Tomimatsu | B03C 3/013 239/690 |
| 6,602,329 B2 * | 8/2003 | Tomimatsu | B03C 3/013 239/690 |
| 7,332,020 B2 | 2/2008 | Tanaka et al. | |
| 7,465,338 B2 | 12/2008 | Kurasek | |
| 7,763,101 B2 * | 7/2010 | Maekawa | B03C 3/08 261/110 |
| 2003/0000384 A1 * | 1/2003 | Tomimatsu | B03C 3/013 95/65 |
| 2003/0000388 A1 * | 1/2003 | Tomimatsu | B03C 3/013 96/44 |
| 2008/0216659 A1 * | 9/2008 | Maekawa | B03C 3/08 96/44 |
| 2015/0135949 A1 | 5/2015 | Matsuura et al. | |

FOREIGN PATENT DOCUMENTS

| | | |
|---|---|---|
| JP | 56-15851 A | 2/1981 |
| JP | 61-143640 U | 9/1986 |
| JP | 63-84657 A | 4/1988 |
| JP | 63-130146 U | 8/1988 |
| JP | 3-123544 U | 12/1991 |
| JP | 7-155641 A | 6/1995 |
| JP | 7-265733 A | 10/1995 |
| JP | 9-262500 A | 10/1997 |
| JP | 10-174899 A | 6/1998 |
| JP | 2000-126647 A | 5/2000 |
| JP | 2001-121030 A | 5/2001 |
| JP | 2002-159879 A | 6/2002 |
| JP | 2004-81929 A | 3/2004 |
| JP | 2004-167453 A | 6/2004 |
| JP | 3564366 B2 | 9/2004 |
| JP | 3572164 B2 | 9/2004 |
| JP | 2006-281048 A | 10/2006 |
| JP | 2006-297182 A | 11/2006 |
| JP | 2008-212803 A | 9/2008 |
| JP | 2009-72772 A | 4/2009 |
| JP | 2010-69463 A | 4/2010 |
| JP | 2014-8464 A | 1/2014 |
| WO | 2011/108324 A1 | 9/2011 |

OTHER PUBLICATIONS

Written Opinion dated Oct. 22, 2013 in International Application No. PCT/JP2013/069664 filed Jul. 19, 2014.
Office Action JP Application No. 2012-161464, dated Aug. 2, 2016.
International Search Report in International Patent Application No. PCT/JP2013/063769, dated Jul. 30, 2013.
Written Opinion in International Patent Application No. PCT/JP2013/063769, dated Jul. 30, 2013.
Office Action in U.S. Appl. No. 14/403,808, dated Jul. 21, 2016.
Office Action in U.S. Appl. No. 14/403,808, dated Oct. 27, 2016.
Office Action in U.S. Appl. No. 14/403,808, dated Mar. 14, 2017.
Office Action in JP Application No. 2012-161464, dated Feb. 7, 2017.

* cited by examiner

WET-TYPE ELECTRIC DUST COLLECTION DEVICE AND DUST REMOVAL METHOD

RELATED APPLICATIONS

The present application is a National Phase of International Application Number PCT/JP2013/069664, filed Jul. 19, 2013, which claims priority from Japanese Application Number 2012-161464, filed Jul. 20, 2012.

TECHNICAL FIELD

The present invention relates to a wet-type electric dust collection device and a dust removal method that remove $SO_3$ mist and the dust.

BACKGROUND ART

An exhaust gas containing dust (particulate matter) is exhausted from industrial combustion facilities, such as an incinerator or a power generation plant for coal burning or heavy oil burning. Additionally, an SOx gas, such as $SO_2$ or $SO_3$, is contained in a combustion exhaust gas. In order to remove the dust and the SOx, an exhaust gas treatment system is provided in a flue on a downstream side of a combustion facility. In the exhaust gas treatment system, an NOx removal device, an air heater, a dust collection device, a wet-type desulfurization device, and a wet-type electric dust collection machine are installed in order from an upstream side, for example, as disclosed in PTL 1. The $SO_3$ is present in a mist state after being cooled by the wet-type desulfurization device in a flow passage of the exhaust gas treatment system.

Although the $SO_3$ mist is as fine as about 0.1 micrometer, the $SO_3$ mist absorbs moisture and is enlarged after passing through the wet-type desulfurization device. If the enlarged mist or dust flows into the wet-type electric dust collection machine, the surface area increases more than that before the enlargement. For this reason, the electrical charging amount of the mist increases, a space charge effect becomes great, and the discharge current of the wet-type electric dust collection machine decreases remarkably. There is a strong correlation between the removal performance of the $SO_3$ mist and the dust and the discharge current, and if an electric current decreases, the removal performance of the $SO_3$ mist and the dust also degrades.

Thus, in PTL 1 and PTL 2, the $SO_3$ mist and the dust are electrically charged in advance before the gas is made to flow into a dust collection unit of the wet-type electric dust collection machine. Additionally, a method is adopted in which droplets with a greater particle diameter than that of the mist are sprayed into the gas, and in order to increase the collision probability of the $SO_3$ mist or the dust, an electrical discharge system that alternately causes positive and negative corona discharges. The charged $SO_3$ mist and dust are attracted to the droplets that are dielectrically polarized by an electrical field by the dust collection unit by the Coulomb force or a gradient force and are absorbed into the droplets. Since the particle diameter of the droplets is great, the droplets are easily collected even by a simple collection device using collision or an inertia force of a demister provided on a downstream side of the wet-type electric dust collection machine.

CITATION LIST

Patent Literature

[PTL 1]: JP-A-2010-69463
[PTL 2]: Japanese Patent No. 3564366

SUMMARY OF INVENTION

Technical Problem

In the wet-type electric dust collection machines of PTL 1 and PTL 2, in order to remove the $SO_3$ mist with high efficiency, a device that preliminarily electrically charges the $SO_3$ mist, a device that sprays the droplets, a demister that traps the droplets, and the like have been indispensable components.

With regard to this, an object of the invention is to provide a wet-type electric dust collection device and a dust removal method that can secure high removal performance of $SO_3$ mist and dust with a simpler device configuration with respect to the condition that the concentration of $SO_3$ mist is relatively low.

Solution to Problem

In order to solve the above problems, the invention is a wet-type electric dust collection device for removing low-concentration $SO_3$ mist and dust contained in a gas. The wet-type electric dust collection device includes a first electrode and a second electrode that are arranged to oppose each other along a flow direction of the gas containing the $SO_3$ mist and the dust and form a DC electrical field; and an electrical field formation part including a plurality of discharge portions that are arrayed and formed at predetermined intervals along the flow direction of the gas on opposing surfaces of the first electrode and the second electrode, the discharge portions of the first electrode and the discharge portions of the second electrode alternately generate corona discharges, which are reversed in polarity relative to each other, in a direction orthogonal to the flow direction of the gas. Electric charges of reversed polarity are alternately imparted to the $SO_3$ mist and the dust, the gas is guided to the electrical field formation part without spraying a dielectric in the gas, and when the gas flows between the first electrode and the second electrode, the first electrode and the second electrode collect the $SO_3$ mist and the dust electrically charged by the corona discharges.

Additionally, the invention is a dust removal method for removing low-concentration $SO_3$ mist and dust contained in a gas. The dust removal method includes an electrical field formation step of forming a DC electrical field between a first electrode and a second electrode that oppose each other; a first gas introduction step of guiding the gas, containing the $SO_3$ mist and the dust that are not electrically charged and not having a dielectric sprayed therein, to between the first electrode and the second electrode in which the DC electrical field is formed; a first electrical charging step of alternately generating corona discharges, which are reversed in polarity relative to each other, using the first electrode and the second electrode, in the DC electrical field, and alternately imparting electric charges of reversed polarity to the $SO_3$ mist and the dust through the corona discharges when the gas flows between the first electrode and the second electrode; and a first collection step of collecting the charged $SO_3$ mist and dust, using the first electrode and the second electrode.

The present inventors have found that it is possible to remove the $SO_3$ mist and the dust with high efficiency even if droplets for collecting the $SO_3$ mist or the like without preliminarily electrically charging the $SO_3$ mist and the dust are not sprayed when a gas containing $SO_3$ mist with a low concentration equal to or less than 10 ppm is made to flow, in a wet-type electric dust collection device configured to alternately impart electric charges of reversed polarity through corona discharges in a DC electrical field. This is because charged particles present between the electrodes of the wet-type electric dust collection device decrease when the $SO_3$ mist concentration is low; therefore, a discharge current required for collection cannot be secured even if there is neither preliminary electrical charging nor droplet spraying. Accordingly, the electric charges of reversed polarity are reliably alternately imparted to the $SO_3$ mist and the dust by the corona discharges in the DC electrical field while the $SO_3$ mist and the dust flow between the electrodes. Since the time taken for the polarity of the charging to change is very short, the influence of the polarity change on the collection performance is small. For this reason, the $SO_3$ mist and the dust are attracted to the electrodes while making a meandering motion, and are adhered to and collected by the electrodes. According to the invention, the high movement speed of the $SO_3$ mist and the dust can be secured when the $SO_3$ mist concentration is low. Therefore, even if there are no droplets of the dielectric within a gas flow passage, degradation of the collection performance caused by a current decrease can be suppressed, and high collection efficiency can be obtained only with the electrodes.

Accordingly, in the wet-type electric dust collection device of the invention, it is unnecessary to provide a preliminary electrical charging unit that electrically charges the $SO_3$ mist or the like in advance or means for spraying droplets of the dielectric. Moreover, since the $SO_3$ mist or the dust is collected by the electrodes, it is unnecessary to provide means for collecting the droplets, such as a demister, in a subsequent stage of the wet-type electric dust collection device. Accordingly, high collection performance can be obtained while simplifying the configuration of the device.

In addition, in the present description, the "$SO_3$ mist" is defined as an $SO_3$ gas being trapped in mist in a gas. When being simply described as "SOx", "$SO_2$", or "$SO_3$", it means to be in a gas state.

Preferably, the above wet-type electric dust collection device further includes a preliminary electrical charging unit that is provided on an upstream side of the electrical field formation part and electrically charges the $SO_3$ mist and the dust; a dielectric spraying unit that is provided on the upstream side of the electrical field formation part and sprays a dielectric in the gas, and a control unit that activates the preliminary electrical charging unit and the dielectric spraying unit when the concentration of the $SO_3$ mist contained in the gas is high and stops the preliminary electrical charging unit and the dielectric spraying unit when the concentration of the $SO_3$ mist contained in the gas is low.

In this case, preferably, a concentration acquisition unit that acquires the concentration of the $SO_3$ mist in the gas is provided on the upstream side of the electrical field formation part.

In the above dust removal method, preferably, a first dust removal step including the first gas introduction step, the first electrical charging step, and the first collection step is carried out when the concentration of the $SO_3$ mist in the gas is equal to or less than a predetermined value, a second dust removal step is carried out when the concentration of the $SO_3$ mist in the gas is greater than the predetermined value, and the second dust removal step includes a preliminary electrical charging step of electrically charging the $SO_3$ mist and the dust in advance; a spraying step of spraying a dielectric in the gas; a second gas introduction step of guiding the charged $SO_3$ mist and dust and the dielectric to between the first electrode and the second electrode in which the DC electrical field is formed; a second electrical charging step of alternately generating the corona discharges of reversed polarity in the DC electrical field, alternately imparting electric charges of reversed polarity to the $SO_3$ mist and the dust when the gas flows between the first electrode and the second electrode, alternately imparting electric charges of reversed polarity to the dielectric, and dielectrically polarizing the dielectric; an adhesion step of adhering the $SO_3$ mist and the dust to the dielectric; and a second collection step of collecting the $SO_3$ mist, the dust, and the dielectric, using the electrodes.

In this case, preferably, the dust removal method further includes a concentration acquisition step of acquiring the concentration of the $SO_3$ mist in the gas, and any one of the first dust removal step and the second dust removal step is carried out on the basis of the concentration of the $SO_3$ mist acquired in the concentration acquisition step.

In the above invention, even if a configuration provided with a preliminary electrical charging unit that electrically charges the $SO_3$ mist or the like in advance or a spray that sprays droplets of the dielectric is adopted, the activation of the preliminary electrical charging unit or the spray is controlled according to the concentration of the $SO_3$ mist in the gas that flows into the wet-type electric dust collection device. By adopting such a configuration, high collection performance can be maintained while operating at a low cost, even in the wet-type electric dust collection device provided with the preliminary electrical charging unit or the spraying spray.

Preferably, the above wet-type electric dust collection device further includes a cleaning unit that cleans the surfaces of the first electrode and the second electrode to which the $SO_3$ mist and the dust are adhered.

Preferably, the above dust removal method further includes a cleaning step of cleaning and removing the $SO_3$ mist, the dust, and the dielectric that are adhered to the electrodes.

The $SO_3$ mist adhered to the surfaces of the electrode surfaces becomes the cause of corrosion of the electrodes generally made of metal. The remaining of the dust to the surfaces of the electrode surfaces can be the cause of an electrical charging hindrance. If the electrodes are cleaned through the above configuration, the maintenance of the device becomes easy, and it is possible to reduce operating costs.

Advantageous Effects of Invention

If the wet-type electric dust collection device and the dust removal method of the invention are applied to an exhaust gas treatment apparatus with a low $SO_3$ mist concentration, the wet-type electric dust collection device can be operated with high collection performance by a simple process. Particularly, in a plant in which a $CO_2$ recovery device is installed, a negative influence is not exerted on a $CO_2$ recovery rate even if a low-concentration $SO_3$ gas flows into the $CO_2$ recovery device. For this reason, it is effective that the wet-type electric dust collection device of the invention is provided on upstream of the $CO_2$ recovery device in which the $SO_3$ mist concentration is approximately equal to or less than 10 ppm or less.

Since the $SO_3$ mist concentration is low, it is possible to apply dust removal that excludes the preliminary electrical charging unit, the dielectric spraying means, and the dielectric collecting means. This case becomes advantageous since high $SO_3$ mist removal performance is obtained as well as the configuration of the device configuration is simplified.

DESCRIPTION OF EMBODIMENTS

Figure 1:
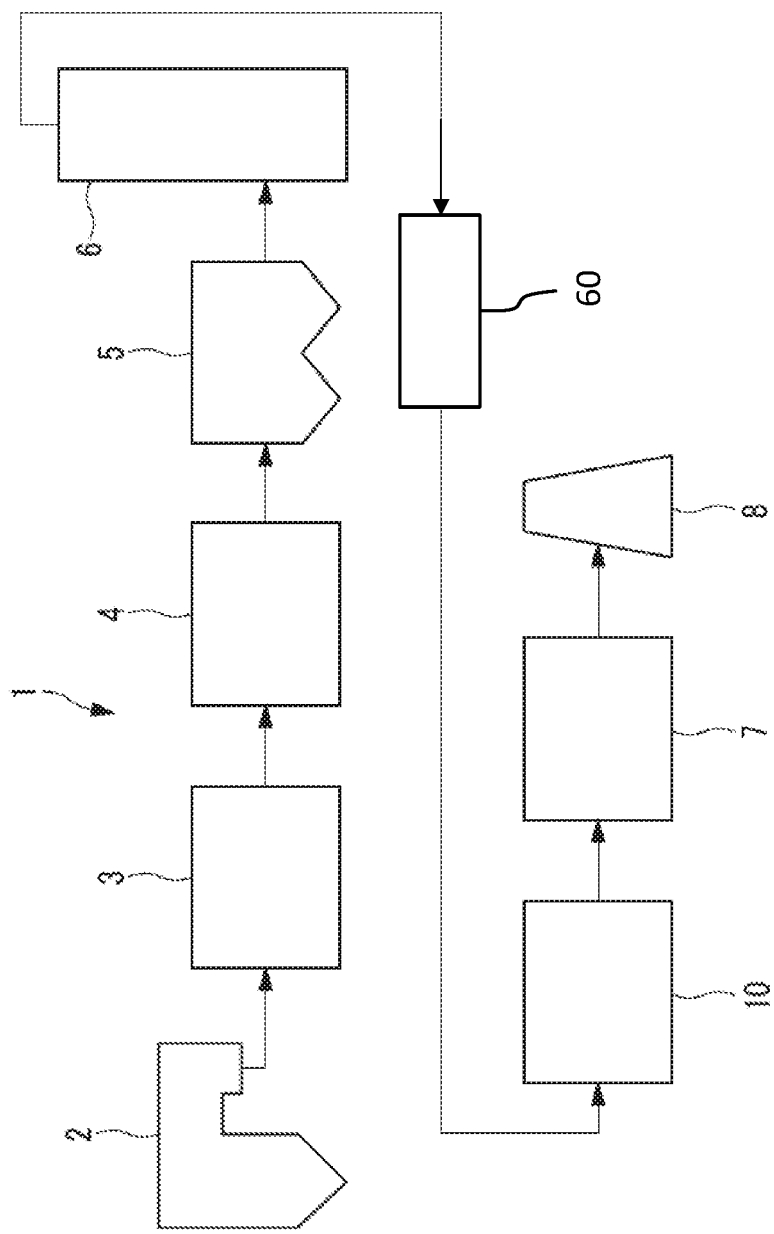
FIG. 1 is a block diagram of an example of an exhaust gas treatment apparatus.

FIG. 1 is a block diagram of an example of an exhaust gas treatment apparatus. The exhaust gas treatment apparatus 1 is provided in a flue on a downstream side of a boiler (combustion furnace) 2. The exhaust gas treatment apparatus 1 includes an NOx removal device 3, an air heater 4, a dry-type electric dust collection device 5, a wet-type desulfurization device 6, a wet-type electric dust collection device 10, a $CO_2$ recovery device 7, and a chimney 8.

The boiler 2 is a boiler that combusts, for example, fuel containing about 1 to 2 mass % of a sulfur component, such as coal. The sulfur component in the coal is analyzed by the methods described in JIS (or Japanese Industrial Standard) M8812 and JIS M8813.

The NOx removal device 3 removes nitrogen oxide (NOx) contained in a combustion exhaust gas that flows in from the boiler 2.

The air heater 4 performs heat exchange between the combustion exhaust gas and combustion air required by a forced draft fan (not shown). Accordingly, the combustion air is heated by the sensible heat of the combustion exhaust gas and is supplied to the boiler 2.

The dry-type electric dust collection device 5 collects smoke dust in the combustion exhaust gas, using an electrostatic force.

The wet-type desulfurization device 6 sprays a water solution containing an absorbent in the combustion exhaust gas, reacts the absorbent with SOx in the exhaust gas, and mainly removes $SO_2$ out of the exhaust gas.

The wet-type desulfurization device 6 is a device adopting a plaster lime method, a sodium method, and a water magnesite method. The absorbent is CaO (lime) in the case of the plaster lime method, NaOH in the case of the sodium method, and $Mg(OH)_2$ in the case of the water magnesite method. A plurality of the wet-type desulfurization devices 6 may be installed so as to become tandem on a flow passage of the exhaust gas.

A desulfurization cooling tower is installed at an inlet portion within the wet-type desulfurization device 6. When the exhaust gas passes through the desulfurization cooling tower, the exhaust gas is rapidly cooled, and the exhaust gas near moisture saturation around 60° C. is discharged from the wet-type desulfurization device 6. Gaseous SO3 is changed into $SO_3$ mist in this cooling process.

Although part of the $SO_3$ mist is removed by the wet-type desulfurization device 6, the removal rate of the $SO_2$ is equal to or more than 90%, whereas the removal rate of the $SO_3$ mist is as low as at most 20%. For this reason, most of the $SO_3$ mist passes through the wet-type desulfurization device 6.

The wet-type electric dust collection device 10 removes the smoke dust and the $SO_3$ mist, which could not be collected by the dry-type electric dust collection device 5 and the wet-type desulfurization device 6, using an electrostatic force.

The $CO_2$ recovery device 7 removes carbon dioxide contained in the exhaust gas. The purified gas is emitted into the atmosphere through the chimney 8.

In the present embodiment, the fuel containing about 1 to 2 mass % of the sulfur component is used. For this reason, the concentration of the $SO_3$ mist in the exhaust gas on the downstream side of the wet-type desulfurization device 6 is reduced to 10 ppm or less. For example, when fuel containing a lot of (about 3% to 6%) a sulfur component, such as heavy oil or asphalt, is used, the concentration of the $SO_3$ mist contained in the exhaust gas on the downstream side of the wet-type desulfurization device 6 reaches 50 ppm or higher after passing through the same process. That is, the exhaust gas that flows into the wet-type electric dust collection device 10 of the present embodiment contains low-concentration $SO_3$ mist.

First Embodiment

Figure 2:
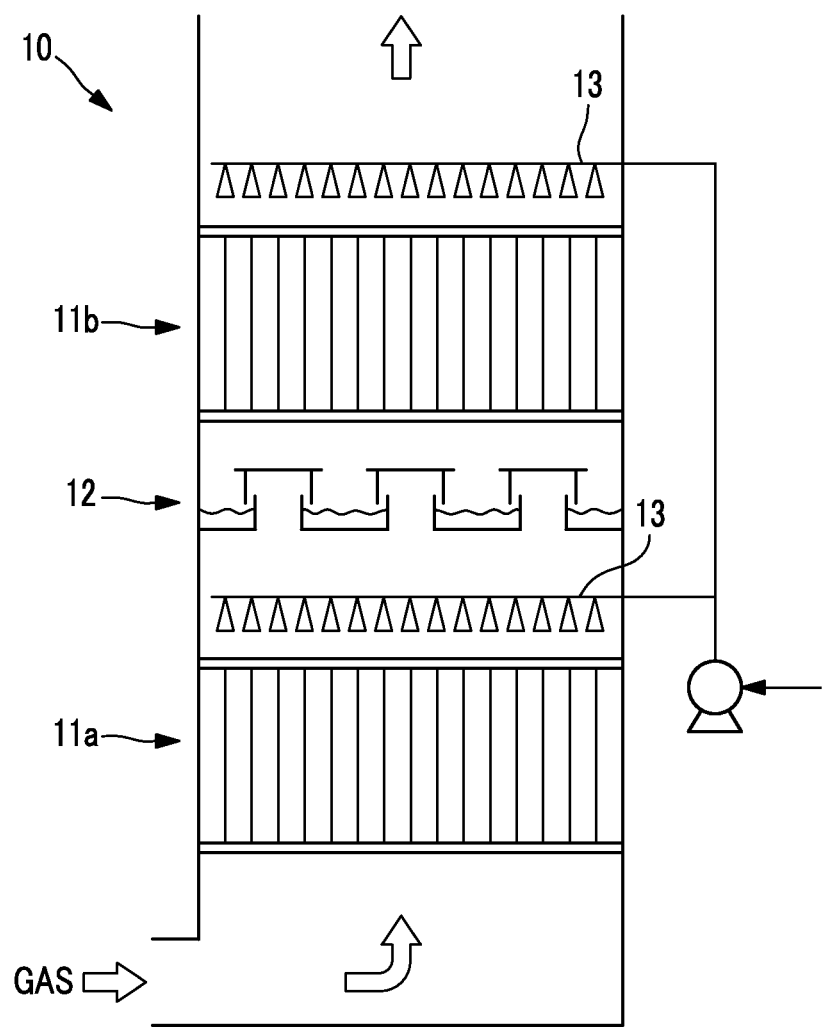
FIG. 2 is a schematic view of a wet-type electric dust collection device related to a first embodiment.

FIG. 2 is a schematic view of the wet-type electric dust collection device related to the first embodiment. The wet-type electric dust collection device 10 includes two electrical field formation parts 11a and 11b arrayed so as to become tandem in a gas flow direction. The exhaust gas flows in from a lower side of the wet-type electric dust collection device 10, passes through the electrical field formation parts 11a and 11b, and is discharged from an upper side of the device. In addition, in FIG. 2, the two electrical field formation parts are provided. However, one or three or more electrical field formation parts may be installed according to the required performance of the wet-type electric dust collection device 10.

As illustrated in FIG. 2, cleaning sprays 13 may be installed above the electrical field formation parts 11a and 11b, respectively. The cleaning sprays 13 are connected to a tank (not illustrated) and cleaning water is sprayed from the cleaning sprays 13 to the respective electrical field formation parts 11a and 11b.

As illustrated in FIG. 2, when a plurality of the electrical field formation parts are installed, a chimney tray is installed on lower sides of electrical field formation parts 11b (lower sides of electrical field formation parts other than the lowest-stage electrical field formation part) as a gas-liquid separator 12 that recovers the cleaning water.

In FIG. 2, a configuration in which the exhaust gas flows so as to ascend from the lower side of the wet-type electric dust collection device 10 is provided. However, a configuration in which the exhaust gas descends from the upper side of the wet-type electric dust collection device may be provided, or a configuration in which the electrical field formation parts are arrayed so that the exhaust gas flows in a lateral direction may be provided.

As a modification example of the wet-type electric dust collection device of the present embodiment, a structure in which the desulfurization device is provided on the upstream side of the wet-type electric dust collection device, a supercooling tower is provided on the downstream side, and the desulfurization device and the supercooling tower are integrated with the wet-type electric dust collection device, respectively can be adopted.

When the configuration in which the exhaust gas ascends from the lower side of the wet-type electric dust collection device is adopted as an integral structure, the wet-type electric dust collection device is installed on the desulfurization device and the supercooling tower is installed on the wet-type electric dust collection device. In this case, in order to exclude the influence caused by the cleaning water or circulating water of the supercooling tower reaching the wet-type electric dust collection device installed at the lower stage of the supercooling tower, gas-liquid separation means is installed on the cleaning spray 13 of each electrical field formation part 11b, or the like.

In the wet-type electric dust collection device 10 of the present embodiment, a preliminary electrical charging unit that electrically charges the $SO_3$ mist and the dust on the upstream side of each electrical field formation part is not provided unlike the related-art wet-type electric dust collection device. Additionally, a spray that sprays a dielectric (water) into the exhaust gas in mist is not installed on the upstream side of each electrical field formation part.

Figure 3:
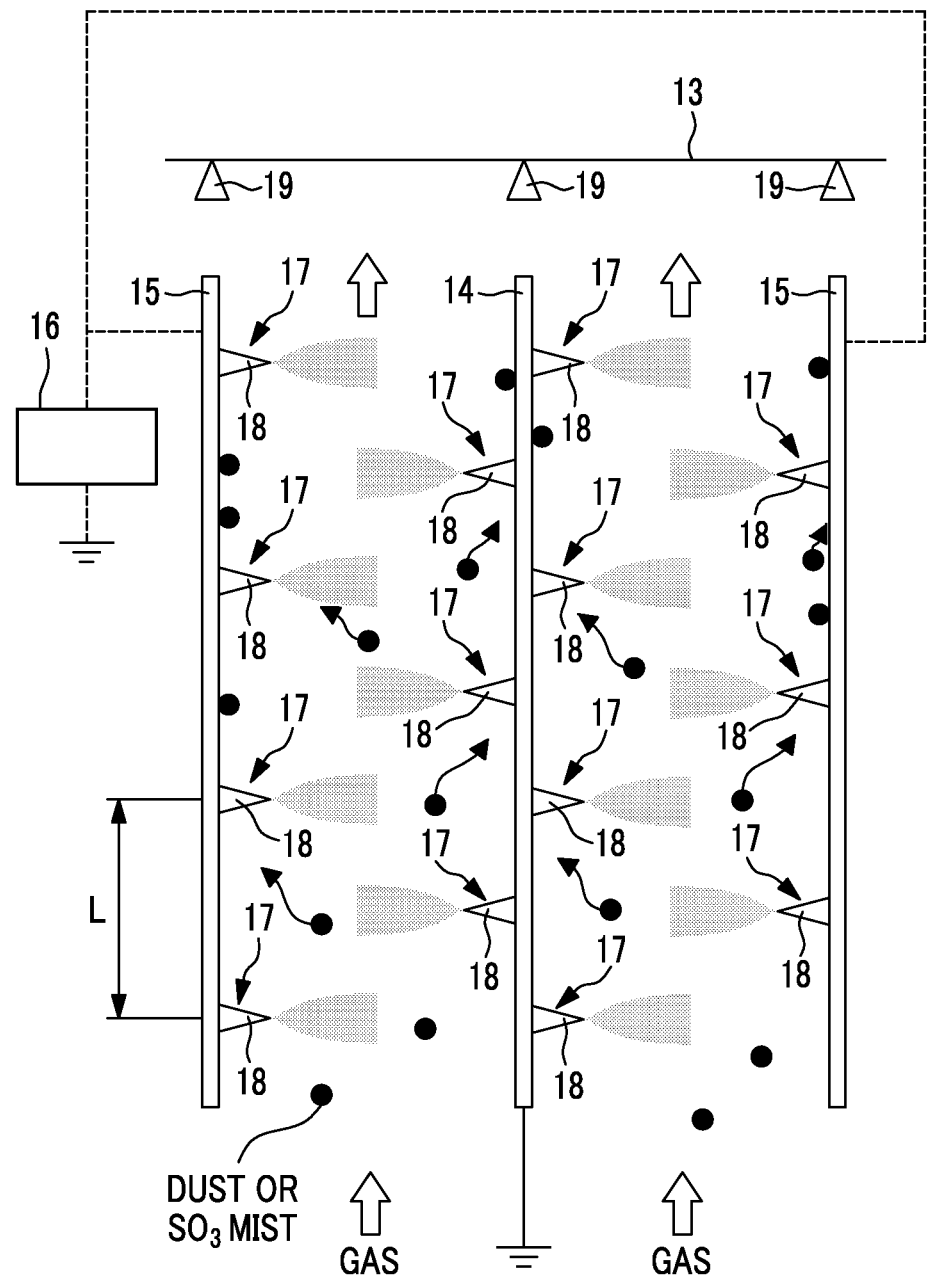
FIG. 3 is an enlarged schematic view of an electrical field formation part.

FIG. 3 is an enlarged schematic view of each electrical field formation part of the wet-type electric dust collection device related to the first embodiment. The electrical field formation part is arranged such that a ground electrode (first electrode) 14 and an imparting electrode (second electrode) 15 oppose each other. A plurality of the ground electrodes 14 and a plurality of the imparting electrodes 15 may be alternately arranged. The ground electrode 14 and the imparting electrode 15 are formed in the shape of a flat plate. Opposing surfaces of the ground electrode 14 and the imparting electrode 15 are arranged along the gas flow direction. The ground electrode 14 is grounded. The imparting electrode 15 is connected to a high-voltage power source 16.

A plurality of discharge portions 17 are formed on the opposing surfaces of the ground electrode 14 and the imparting electrode 15, respectively. The discharge portions 17 are arrayed at predetermined intervals along the gas flow direction within the ground electrode 14 and the imparting electrode 15. Meanwhile, the discharge portions 17 of the ground electrode 14 and the discharge portions 17 of the imparting electrode 15 are arranged so as to shift from each other. In FIG. 3, when the interval between the discharge portions 17 within the ground electrode 14 and the imparting electrode 15 is defined as L, the discharge portions 17 are alternately arrayed with a phase difference of L/2 in the ground electrode 14 and the imparting electrode 15.

In the present embodiment, one discharge portion 17 is constituted of a plurality of projection-shaped discharge electrodes 18. A plurality of discharge electrodes 18 are arrayed at predetermined intervals in a depth direction of a sheet plane of FIG. 3. In FIG. 3, one row of the discharge electrodes 18 is formed within one discharge portion 17 when viewed in a cross-section parallel to the gas flow direction. However, a plurality of rows of the discharge electrodes 18 may be formed in the gas flow direction.

When the cleaning sprays 13 are installed, spray nozzles 19 are installed above the ground electrode 14 and the imparting electrode 15, respectively.

Figure 4:
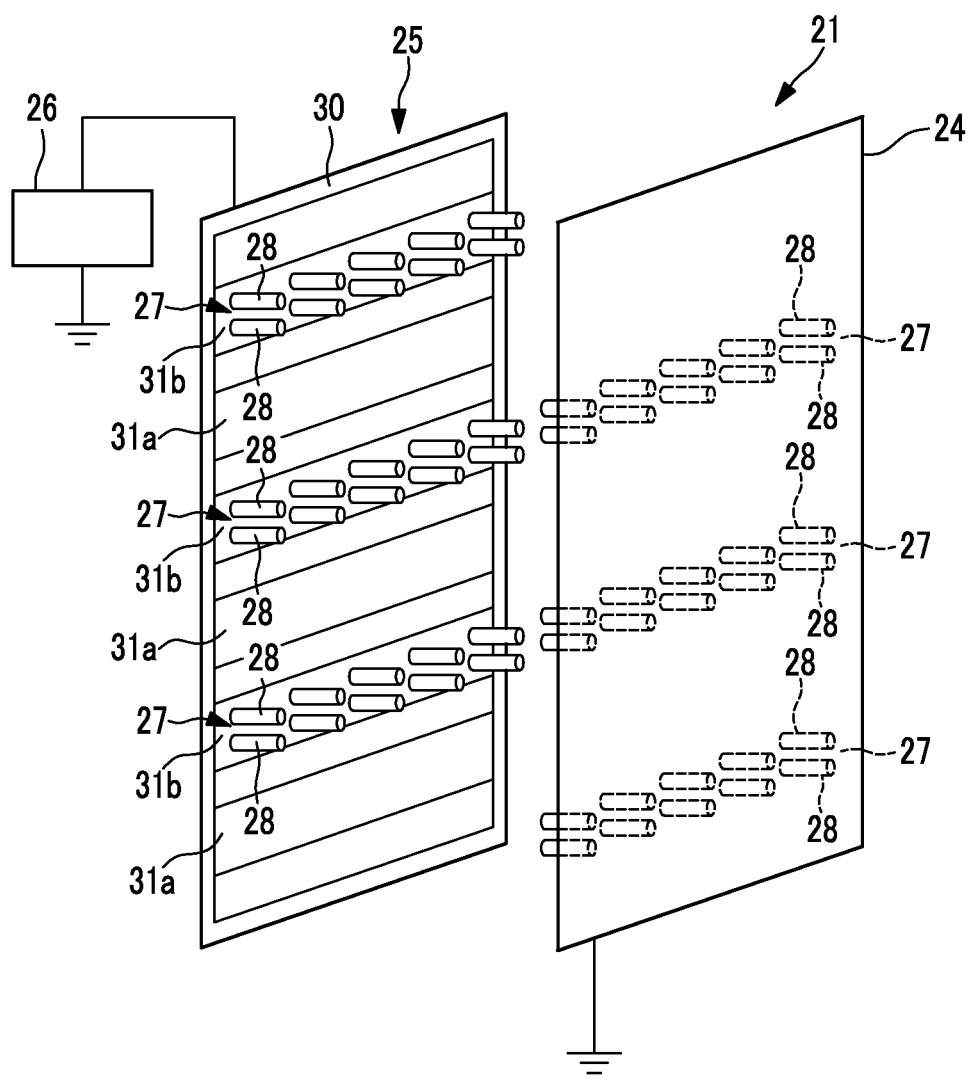
FIG. 4 is an enlarged schematic view of another example of the electrical field formation part.

FIG. 4 is an enlarged schematic view of another example of the electrical field formation part. In an electrical field formation part 21 of FIG. 4, a ground electrode 24 is flat-plate-shaped. A plurality of discharge portions 27 are provided on the ground electrode 24 along the gas flow direction. A plurality of discharge electrodes 28 are arrayed in a direction perpendicular to the gas flow direction on each discharge portion 27 of the ground electrode 24. Additionally, one row or a plurality of rows of the discharge electrodes 28 are formed along the gas flow direction.

An imparting electrode 25 has a configuration in which a plurality of flat plate portions 31a and 31b are arrayed along the gas flow direction on a discharge frame 30. The flat plate portions 31a and 31b are alternately arranged.

The flat plate portions 31a are arranged at positions that oppose portions where the discharge portions 27 of the ground electrode 24 are formed. Each flat plate portion 31a is formed in a plane extending in the direction substantially perpendicular to the gas flow direction, and is installed in order to receive a discharge current from each discharge portion installed in the ground electrode 24.

Each flat plate portion 31b is arranged at a position that opposes the planar portion of the ground electrode 24 where each discharge portion 27 is not formed. The flat plate portion 31b is installed with a plurality of the projection-shaped discharge electrodes 28. The plurality of discharge electrodes 28 formed on the flat plate portion 31b are formed in the direction perpendicular to the gas flow direction. Additionally, in FIG. 4, a plurality of rows of the discharge electrodes 28 are formed along the gas flow direction.

The flat plate portions 31b in each of which the discharge portion 27 is formed are arranged at predetermined intervals L. The discharge portions 27 of the ground electrode 24 and the discharge portions 27 (flat plate portions 31b) of the imparting electrode 25 are arranged so as to shift from each other with a phase difference of L/2.

Figure 5:
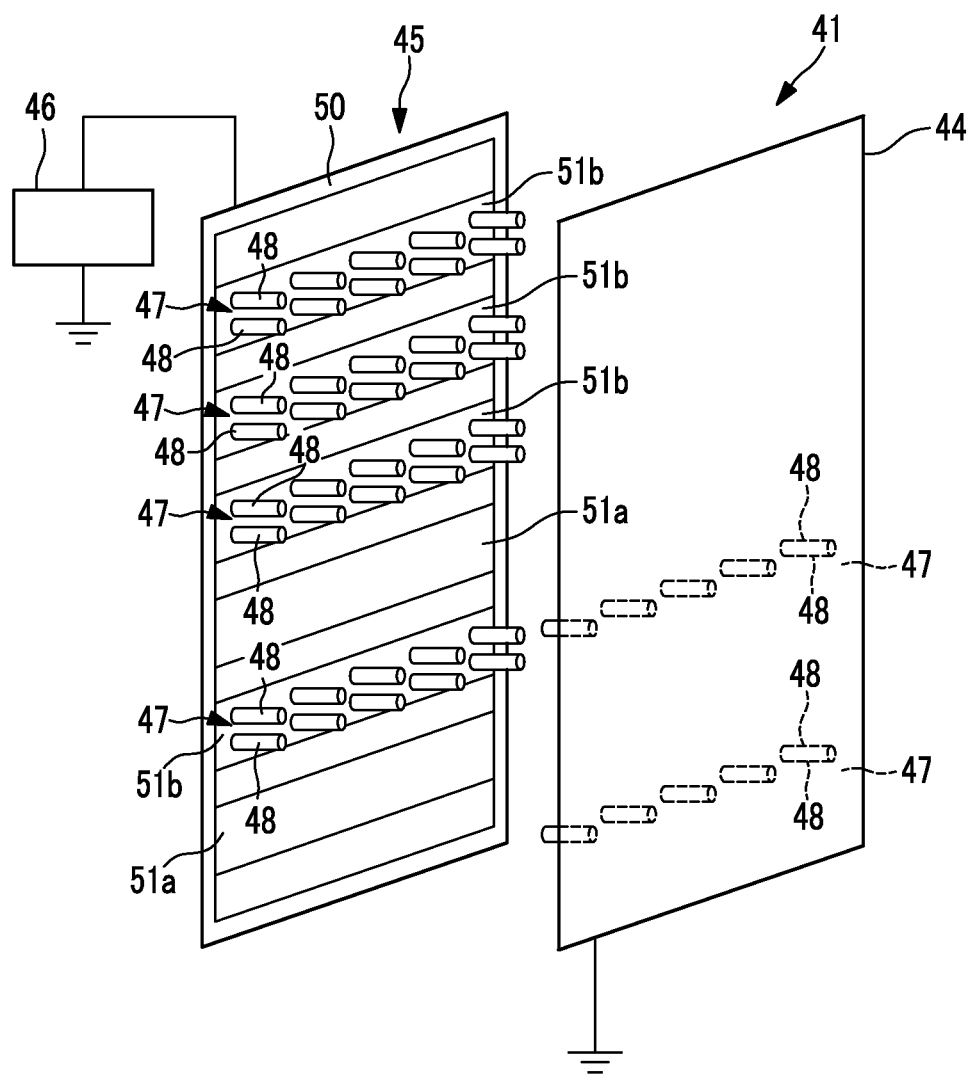
FIG. 5 is an enlarged schematic view of still another example of the electrical field formation part.

FIG. 5 is an enlarged schematic view of still another example of the electrical field formation part. In an electrical field formation part 41 of FIG. 5, a ground electrode 44 is flat-plate-shaped. Discharge portions 47 (in FIG. 5, the discharge portions 47 are two) are provided only on a gas inlet side (lower side in FIG. 5) of the ground electrode 44, and no discharge portion is provided on a gas downstream side. A plurality of discharge electrodes 48 are formed in the direction perpendicular to the gas flow direction on each discharge portion 47 of the ground electrode 44. One row or a plurality of rows of the discharge electrodes 48 are formed along the gas flow direction.

In an imparting electrode 45, a plurality of flat plate portions 51a and 51b are arrayed along the gas flow direction on a discharge frame 50. The flat plate portions 51a and the flat plate portions 51b are alternately arranged on a gas upstream side. Each flat plate portion 51a where no discharge electrode is provided is provided at a position that opposes each discharge portion 47 of the ground electrode 44. Only the flat plate portions 51b in each of which the discharge electrodes 48 are formed are arranged at predetermined intervals on the gas downstream side.

A method of removing dust using the wet-type electric dust collection device of the first embodiment will be described below with reference to FIGS. 2 and 3.

In the electrical field formation parts 11a and 11b, a DC electrical field is formed between the ground electrode 14 and the imparting electrode 15. Additionally, since a negative high voltage is imparted to the imparting electrode in a normal wet-type electric dust collection device, positive corona discharges are generated from the discharge electrodes 18 of the ground electrode 14, and negative corona discharges are generated from the discharge electrodes 18 of the imparting electrode 15.

The exhaust gas, of which the $SO_3$ mist has been reduced to 10 ppm or less through the NOx removal device 3 to the wet-type desulfurization device 6 of the exhaust gas treatment apparatus 1, flows into the inside of the wet-type electric dust collection device 10 from the lower side thereof. The dust that could not be removed by the dry-type electric dust collection device 5 and the wet-type desulfurization device 6 is also contained in this exhaust gas.

The exhaust gas is rapidly cooled to about 60° C. by the desulfurization cooling tower of the wet-type desulfurization device 6. $SO_3$ vapor-deposits in the process of becoming a moisture saturation gas around 60° C., and is present as sulfuric acid mist ($SO_3$ mist) in which the $SO_3$ is trapped. Although the particle diameter of the $SO_3$ mist becomes finer as a temperature difference between a temperature at an inlet and a temperature at an outlet in the desulfurization cooling tower becomes greater, the average particle diameter of the $SO_3$ mist is approximately around 0.1 μm.

In the wet-type electric dust collection device 10 of the first embodiment, the preliminary electrical charging unit is not installed on the upstream side of the electrical field formation part 11a. For this reason, the $SO_3$ mist and the dust are in a state where the $SO_3$ mist and the dust are not electrically charged at the inlets of the electrical field formation parts 11a and 11b. Additionally, in the wet-type electric dust collection device 10 of FIG. 2, a spray that sprays a dielectric (water) is not installed on the upstream side of the electrical field formation part 11a. Accordingly, in the first embodiment, the mist of a dielectric sprayed from the outside of a system is not contained in the exhaust gas just before the electrical field formation part 11a.

The exhaust gas that contains the $SO_3$ mist and the dust which is not electrically charged and does not contain the dielectric mist supplied from the outside of the system flows into the electrical field formation parts 11a and 11b where the DC electrical field and the corona discharges are generated. The flow velocity of the gas within the wet-type electric dust collection device 10 is controlled to 5 m/sec or less.

The $SO_3$ mist and the dust that have flowed into the electrical field formation parts 11a and 11b are electrically charged by the corona discharges. Since corona discharges are generated with different polarities in the discharge electrodes 18 of the ground electrode 14 and the discharge electrodes 18 of the imparting electrode 15, the charging polarity of the $SO_3$ mist and the dust changes alternately while flowing through the electrical field formation parts 11a and 11b.

Since the $SO_3$ mist is fine as described above, if charges are given to the mist and the dust by the corona discharges, charge density per unit gas quantity becomes very high. If the charge density per unit gas quantity becomes high when unipolar corona discharges are generated, an electric current caused by the corona discharges is remarkably suppressed and the charging performance degrades. In the present embodiment, positive and negative corona discharges are alternately generated in the gas flow direction as described above. For this reason, the $SO_3$ mist and the dust that are electrically charged with polarities reversed to the polarities of the discharges are supplied to a discharge area of each discharge portion. As a result, the charges of space are neutralized, the amount of space charges is reduced, and the suppressing effect of the electric current is improved. The changeover times of the polarities are very short, and the influence of the collection performance of the $SO_3$ mist is substantially negligible under the condition of a gas flow velocity of 5 m/sec or less.

While the charged $SO_3$ mist and dust flow through the electrical field formation parts 11a and 11b, the $SO_3$ mist and the dust proceed while meandering slightly under the influence of the DC electrical field and approach the ground electrode 14 or the imparting electrode 15. The $SO_3$ mist and the dust brought close to the ground electrode 14 or the imparting electrode 15 are adhered to and collected by the ground electrode 14 or the imparting electrode 15. Accordingly, the $SO_3$ mist and the dust are removed out of the exhaust gas.

When the cleaning spray 13 is installed, the cleaning water is continuously or intermittently sprayed from the spray nozzles 19 to the ground electrode 14 and the imparting electrode 15. The $SO_3$ mist and the dust adhered to the electrodes 14 and 15 are trapped in the cleaning water. The cleaning water is recovered in the gas-liquid separator 12, or falls to a lower portion of the wet-type electric dust collection device.

If the lengths of the electrical field formation parts 11a and 11b in a gas flow direction are secured according to required collection performance in consideration of the movement speed and gas velocity of the $SO_3$ mist and the dust by the electrical field (for example, about 4 m), it is possible to sufficiently remove the $SO_3$ mist and the dust out of the exhaust gas.

The collection performance of the $SO_3$ mist and the dust in the present embodiment is influenced by the concentration of particles (the $SO_3$ mist and the dust), the intensity of the DC electrical field, specific dust collection area (the total area of the ground electrode of the electrical field formation part per unit gas quantity), and the gas temperature of the inlet of the cooling tower of the wet-type desulfurization device.

The collection performance η is expressed by Expression (1).

[Expression 1]

$$\eta=1-\exp(-(Wk'\times f)^m) \quad (1)$$

$W_k'$: Movement speed of particles (m/sec)
f: Specific dust collection area (s/m)
m: Constant Here, the constant m is a design factor set according to the types of the particles.

According to Expression (1), the collection performance depends on the movement speed of the particles, and the collection performance η becomes higher as the movement speed $W_k'$ is greater.

The movement speed $W_k'$ is greatly influenced by the discharge current. The current density $J(A/m^2)$ of the discharge current is expressed by Expression (2).

[Expression 2]

$$J=k_1 T_g^{a1} E^{b1}(C/f)^{c1} \quad (2)$$

$T_g$: Gas temperature (° C.) of inlet of cooling tower
E: Intensity (V/m) of DC electrical field
C: Concentration (ppm) of particles (SOx mist and dust)
$k_1$, $a_1$, $b_1$, and $c_1$: Constants The movement speed $W_k'$ is expressed by Expression (3).

[Expression 3]

$$Wk' = k_2 T_g^{a2}(P/F)^{b2}f^{c2}C^{d2} \quad (3)$$

P/F: product of voltage and current density J
$k_2$, $a_2$, $b_2$, $c_2$, and $d_2$: Constants The current density J of the discharge current is calculated by Expression (2). $W_k'$ is calculated using the calculated current density.

The influence that the particle concentration, the intensity of the DC electrical field, a gas flow velocity, and the gas temperature of the inlet of the cooling tower exerted on the movement speed was verified using the wet-type electric dust collection device provided with the two electrical field formation parts. When the electrode area is made constant, the specific dust collection area f is equivalent to a gas flow velocity ratio.

In "Example 1", as shown in FIGS. 3 and 4, the discharge portions were formed on the whole imparting electrode in the electrical field formation part on the upstream side and the downstream side to alternately generate the positive and negative corona discharges in the gas flow direction.

In "Example 2", as illustrated in FIG. 5, the two-stage discharge portions of the ground electrode were installed from near the inlet of the wet-type electric dust collection device in the electrical field formation part on the upstream side, and no discharge portions are formed but a flat plate is formed on the imparting electrode of the electrical field formation part on the downstream side formed as a flat plate on the rear stream side. That is, in Example 2, the positive and negative corona discharges were generated on the inlet side of the wet-type electric dust collection device, and only the negative corona discharge was generated on the rear stream side.

A "comparative example" is a case using a wet-type electric dust collection device having a configuration in which the same electrical field formation part as FIG. 4 is applied and a preliminary electrical charging unit and a dielectric mist spraying spray is installed before the electrical field formation part. In Comparative Example, $SO_3$ mist and dust are electrically charged by preliminary charging before the gas flows into the electrical field formation part. Additionally, droplets with a greater particle diameter than the mist are sprayed into the gas. The charged $SO_3$ mist and dust are attracted to the droplets that are dielectrically polarized by the Coulomb force and are absorbed into the droplets. Big droplets are collected by dielectric collecting means (demister or the like) provided on the downstream side of the wet-type electric dust collection machine.

The electrode area was made constant in the respective Examples and Comparative Example.

Figure 6:
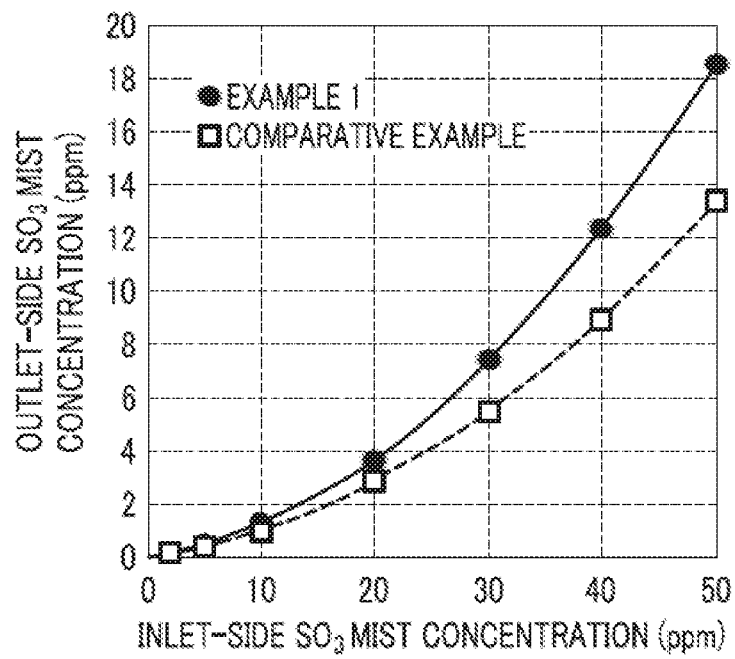
FIG. 6 is a correlation diagram between $SO_3$ concentrations on inlet sides and outlet sides of wet-type electric dust collection devices.

FIG. 6 is a correlation diagram between $SO_3$ mist concentrations on inlet sides and outlet sides of the wet-type electric dust collection devices regarding Example 1 and Comparative Example. In this drawing, the horizontal axis represents the $SO_3$ mist concentrations on the inlet sides, and the vertical axis represents the $SO_3$ mist concentrations on the outlet sides. The $SO_3$ mist concentrations are results obtained by performing sampling and concentration measurement. FIG. 6 illustrates an example of data at an inlet gas temperature of 140° C.

As illustrated in FIG. 6, the outlet-side $SO_3$ mist concentrations of Example 1 and Comparative Example are almost the same when the $SO_3$ mist concentrations on the inlet sides are equal to or less than 10 ppm. Meanwhile, if the inlet-side $SO_3$ mist concentrations exceed 10 ppm, the graph of Example 1 and the graph of Comparative Example are separated from each other and deviate as the concentrations increase.

It can be said from FIG. 6 that, in the above inlet-side $SO_3$ mist concentration range, the $SO_3$-mist removal performances of Example 1 and Comparative Example are almost the same.

Figure 7:
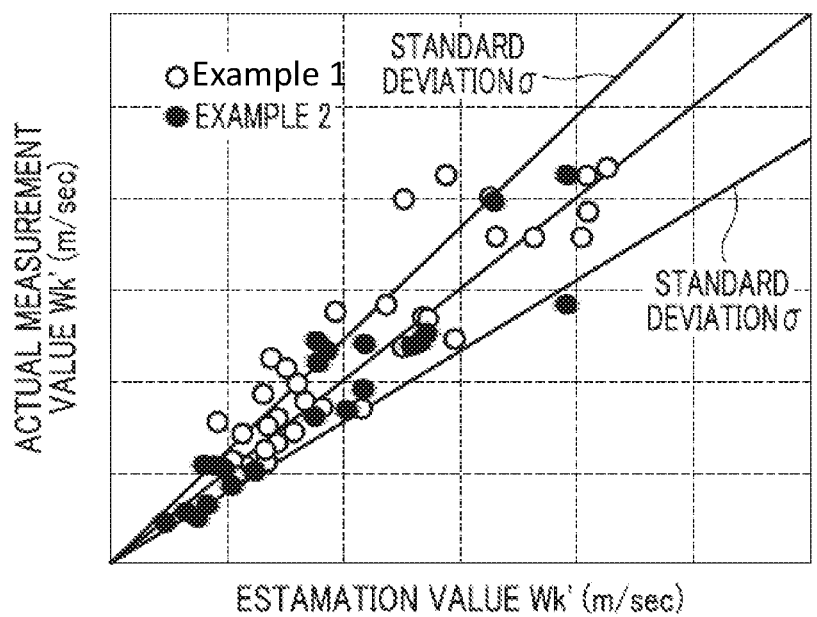
FIG. 7 is a graph showing the correlation between actual measurement values and estimation values of movement speeds $W_k'$ in Example 1 and Example 2.

FIG. 7 is a graph showing the correlation between actual measurement values and estimation values of movement speeds $W_k'$ regarding Example 1 and Example 2. In this drawing, the horizontal axis represents the estimation values of the movement speed $W_k'$, and the vertical axis represents the actual measurement values of the movement speed $W_k'$. The estimation values are values calculated from Expression (3). As for the actual measurement values, the $SO_3$ mist concentrations were measured by sampling, and the values of $W_k'$ were calculated from the results. The graph is a case where the inlet-side $SO_3$ mist concentrations are equal to or less than 10 ppm. In this graph, a line on which the standard deviations of the actual measurement values with respect to the estimation values are 0%, and a line on which the standard deviations reach a predetermined value σ.

According to FIG. 7, in Example 1 and Example 2, the variations of the actual measurement values and estimation values of the movement speed have almost the same variation tendency. It can be said from these results that Example 1 and Example 2 have different electrode structures but have comparable collection performance.

As mentioned above, when the concentration of the $SO_3$ mist that flows into the wet-type electric dust collection device is as low as 10 ppm or less, the collection performance can be improved even if the preliminary electrical charging of the mist or the spraying of the dielectric is not performed. In the wet-type electric dust collection devices of Example 1, the preliminary electrical charging unit or the sprays that spray the dielectric becomes unnecessary while an $SO_3$ mist removal performance equivalent to the related art type is given. Thus, the cost reduction of the devices can be achieved.

Second Embodiment

Figure 8:
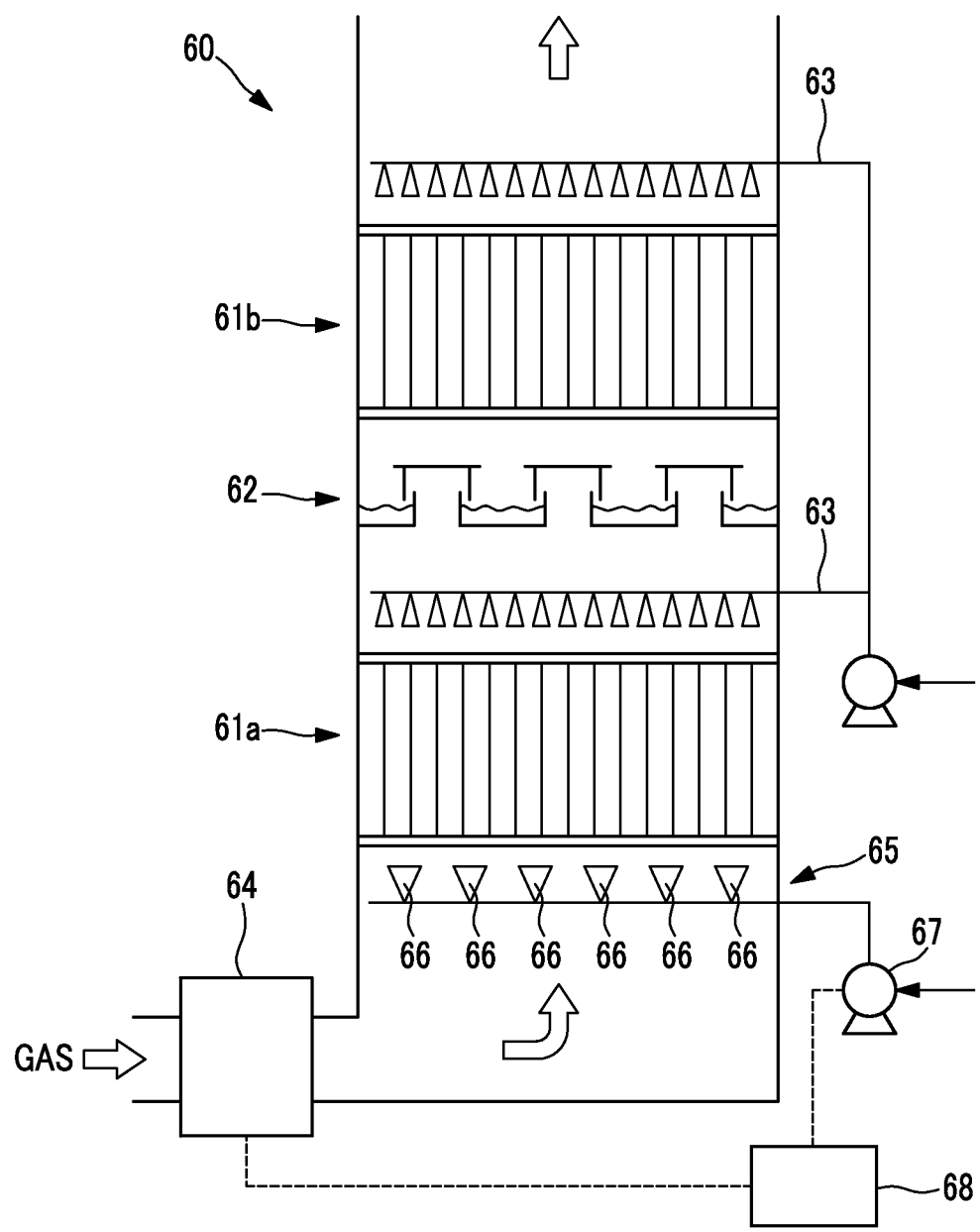
FIG. 8 is a schematic view of a wet-type electric dust collection device related to a second embodiment.

FIG. 8 is a schematic view of a wet-type electric dust collection device related to a second embodiment. The wet-type electric dust collection device 60 includes electrical field formation parts 61a and 61b, a preliminary electrical charging unit 64, a dielectric spraying unit 65, and a control unit 68.

The preliminary electrical charging unit 64 is installed at an inlet of the wet-type electric dust collection device 60 on the upstream side of the electrical field formation parts 61a and 61b. The preliminary electrical charging unit 64 has an electrode portion therein. The electrode portion has, for example, a structure including a plurality of projection-shaped discharge electrodes supported by a support, and a flat-plate-shaped ground electrode. In this case, the electrode portion is arranged such that tips of the discharge electrodes and the ground electrode oppose each other and the support and the ground electrode are substantially parallel with each other. A high voltage power source is connected to the support, and corona discharges are generated by the discharge electrodes. Gas flows between the support and the ground electrode and $SO_3$ mist and dust in the exhaust gas are electrically charged with a positive or negative polarity by the corona discharges.

The dielectric spraying unit 65 that sprays a dielectric (water) into the exhaust gas is installed on downstream of the preliminary electrical charging unit 64. The dielectric spraying unit 65 is constituted of one or a plurality of nozzles 66, and a pump 67 that supplies the dielectric to the nozzles 66. Droplets of the dielectric (water) sprayed from the dielectric spraying unit 65 have about 600 μm.

The electrical field formation parts 61a and 61b have the same configuration as that of the first embodiment. In FIG. 8, the two electrical field formation parts are provided. However, one or three or more electrical field formation parts may be installed according to required performance.

Similar to the first embodiment, a cleaning spray 63 may be installed above a ground electrode and an imparting electrode of each of the electrical field formation parts 61a and 61b. In this case, a spray nozzle may be installed above each of the ground electrode and the imparting electrode. The cleaning sprays 63 are connected to a tank (not illustrated).

A chimney tray 62 that recovers the cleaning water is installed above the electrical field formation part 61a.

The control unit 68 is connected to the preliminary electrical charging unit 64 and the dielectric spraying unit 65. The control unit 68 is adapted to be able to acquire information on $SO_3$ mist concentration in the exhaust gas that flows into the electrical field formation part 61. The information on the $SO_3$ mist concentration is numerical values calculated from sulfur content in fuel that is combusted in the boiler, or actual measurement values of the $SO_3$ mist concentration. The sulfur content in the fuel is analyzed by the methods described in the above-described JIS M8812 and JIS M8813.

In the present embodiment, a concentration acquisition unit that acquires the $SO_3$ mist concentration may be installed on an upstream side of the electrical field formation part 61a. The concentration acquisition unit is connected to the control unit 68.

It is preferable that the concentration acquisition unit be installed closer to the upstream side than the preliminary electrical charging unit 64. For example, the concentration acquisition unit is installed at the inlet of the wet-type electric dust collection device 60 or at a flow passage between the wet-type desulfurization device and the wet-type electric dust collection device. The concentration acquisition unit is an instrument that can sample the gas from the inlet of the wet-type electric dust collection device inlet or the flow passage, and measure the $SO_3$ mist concentration according to the transmittance of light. Otherwise, the concentration acquisition unit may be constituted of an instrument that measure a discharge current in the preliminary electrical charging unit 64, and the control unit 68, and the control unit 68 may compare the value of the measured discharge current with a threshold value, thereby estimating the $SO_3$ mist concentration.

In FIG. 8, a configuration in which the exhaust gas flows so as to ascend from the lower side of the wet-type electric dust collection device 60 is provided. However, a configuration in which the exhaust gas descends from the upper side of the wet-type electric dust collection device may be provided, or a configuration in which the electrical field formation parts are arrayed so that the exhaust gas flows in a substantially horizontal direction may be provided.

A method of removing dust using the wet-type electric dust collection device of the second embodiment will be described below.

In the electrical field formation parts 61a and 61b, a DC electrical field is formed between the ground electrode and the imparting electrode. Additionally, negative or positive corona discharge is generated from the discharge electrodes of the ground electrode and the imparting electrode.

The control unit 68 acquires the sulfur content of the fuel analyzed by the method described in by JIS M8812 or JIS M8813. The control unit 68 estimates the $SO_3$ mist concentration in the exhaust gas that flows into the wet-type electric dust collection device 60, from the sulfur content of the fuel and the performance of the wet-type desulfurization device.

Otherwise, when the concentration acquisition unit measures the $SO_3$ mist concentration, the above-described instrument measures the $SO_3$ mist concentration in the exhaust gas that flows into the wet-type electric dust collection device 60, and the control unit 68 acquires the information on the $SO_3$ mist concentration from the concentration acquisition unit.

The control unit 68 compares the acquired $SO_3$ mist concentration with a threshold value of the $SO_3$ mist concentration that is input in advance. Here, the threshold value is a value that is determined in consideration of $SO_3$ mist collection efficiency in the electrical field formation parts 61a and 61b or the electrode structure of the electrical field formation parts 61a and 61b. Specifically, the threshold value is set to 10 ppm.

When the concentration acquisition unit measures the discharge current, the above-described instrument measures the discharge current in the preliminary electrical charging unit 64, and the control unit 68 acquires information on the discharge current. The correlation between the threshold value of the $SO_3$ mist concentration and the threshold value of the discharge current is stored in advance in the control unit 68. The control unit 68 compares the value of the measured discharge current with the threshold value of the discharge current correlated with the $SO_3$ mist concentration.

When the acquired $SO_3$ mist concentration is equal to or less than a threshold value, the control unit 68 stops the preliminary electrical charging unit 64 and the dielectric spraying unit 65. Accordingly, the $SO_3$ mist and the dust in the exhaust gas flow into the electrical field formation parts 61a and 61b in a state where the $SO_3$ mist and the dust are not electrically charged even if passing through the preliminary electrical charging unit 64. Additionally, a dielectric (water mist) supplied from the outside of a system is not contained in the exhaust gas.

The $SO_3$ mist and the dust that have flowed into the electrical field formation parts 61a and 61b and have not been electrically charged are adhered to and collected by the ground electrodes and the imparting electrodes of the electrical field formation parts 61a and 61b in the same process as that of the first embodiment.

When the acquired $SO_3$ mist concentration exceeds the threshold value, the control unit 68 activates the preliminary electrical charging unit 64. The preliminary electrical charging unit 64 generates corona discharges from the discharge electrodes. The $SO_3$ mist and the dust that are contained in the gas passed between the electrodes in the preliminary electrical charging unit 64 are electrically charged with a positive or negative polarity by the corona discharges. The charged $SO_3$ mist and dust are conveyed to the electrical field formation part 61 by the gas.

The control unit 68 activates the dielectric spraying unit 65. The dielectric spraying unit 65 supplies the dielectric to the nozzles 66 with the pump 67, and sprays water mist with a particle diameter of about 600 μm into the gas from the nozzles 66. The sprayed water mist is conveyed to the electrical field formation parts 61a and 61b by the exhaust gas together with the $SO_3$ mist and the dust.

The water mist conveyed to the electrical field formation parts 61a and 61b is alternately electrically charged with a positive or negative polarity by the corona discharges that are reversed in polarity relative to each other, and are dielectrically polarized by electrical fields applied to the electrical field formation parts. The charged and dielectrically polarized water mist proceeds while meandering under the influence of the DC electrical field and approaches the ground electrode or the imparting electrode. Meanwhile, the charged partial $SO_3$ mist or dust is collected by the water mist that is present therearound by the Coulomb force. In addition, big droplets are collected by a dielectric collection device (demister or the like) provided on the downstream side of the wet-type electric dust collection device.

Additionally, the partial $SO_3$ mist and the dust are alternately electrically charged with the reversed polarities by the corona discharges. Accordingly, the partial $SO_3$ mist and the dust proceed so as to approach an electrode while meandering. The $SO_3$ mist or the dust brought close to the ground electrode or the imparting electrode is adhered to and collected by the electrodes.

When the cleaning spray 63 is installed, the cleaning water is intermittently sprayed from the spray nozzles to the ground electrode and the imparting electrode, respectively. The $SO_3$ mist and the dust adhered to the electrodes are trapped in the cleaning water, and are recovered in the chimney tray 62 or are dropped to a lower portion of the wet-type electric dust collection device.

If the activation of the preliminary electrical charging unit and a dielectric spraying unit is controlled on the basis of the $SO_3$ mist concentration as in the second embodiment, the removal performance can be kept substantially constant even when the $SO_3$ mist concentration has fluctuated. Additionally, since the preliminary electrical charging unit and the dielectric spraying unit are not activated when the $SO_3$ mist has a low concentration, low-cost operation becomes possible.

REFERENCE SIGNS LIST

1: EXHAUST GAS TREATMENT APPARATUS
2: BOILER
3: NOx REMOVAL DEVICE
4: AIR HEATER
5: DRY-TYPE ELECTRIC DUST COLLECTION DEVICE
6: WET-TYPE DESULFURIZATION DEVICE
7: $CO_2$ RECOVERY DEVICE
8: CHIMNEY
10, 60: WET-TYPE ELECTRIC DUST COLLECTION DEVICE
11a, 11b, 41, 61a, 61b: ELECTRICAL FIELD FORMATION PART
12, 62: CHIMNEY TRAY
13, 63: CLEANING SPRAY
14, 24, 44: GROUND ELECTRODE
15, 25, 45: IMPARTING ELECTRODE
16, 26, 46: HIGH VOLTAGE POWER SOURCE
17, 27, 47: DISCHARGE PORTION
18, 28, 48: DISCHARGE ELECTRODE
19: SPRAY NOZZLE
30, 50: DISCHARGE FRAME
31a, 31b, 51a, 51a: FLAT PLATE PORTION
64: PRELIMINARY ELECTRICAL CHARGING UNIT
65: DIELECTRIC SPRAYING UNIT
66: NOZZLE
67: PUMP
68: CONTROL UNIT

The invention claimed is:

1. A wet-type electric dust collection device for removing low-concentration $SO_3$ mist and dust contained in a gas, the wet-type electric dust collection device comprising:
a first electrode and a second electrode that are arranged to oppose each other along a flow direction of the gas containing the $SO_3$ mist and the dust and form a DC electrical field;
an electrical field formation part including a plurality of discharge portions that are arrayed and formed at predetermined intervals along the flow direction of the gas on opposing surfaces of the first electrode and the second electrode, and a high voltage power source;
a preliminary electrical charging unit that is provided on an upstream side of the electrical field formation part and electrically charges the $SO_3$ mist and the dust;
a dielectric spraying unit that is provided on the upstream side of the electrical field formation part and sprays a dielectric in the gas,
a concentration acquisition unit that acquires the concentration of the $SO_3$ mist in the gas is provided on the upstream side of the electrical field formation part; and
a control unit that compares the $SO_3$ mist concentration acquired by the concentration acquisition unit with a threshold value of the $SO_3$ mist concentration which is input in advance and that activates the preliminary electrical charging unit and the dielectric spraying unit when the concentration of the $SO_3$ mist contained in the gas is high and stops the preliminary electrical charging unit and the dielectric spraying unit when the concentration of the $SO_3$ mist contained in the gas is low,
wherein the discharge portions of the first electrode and the discharge portions of the second electrode alternately generate corona discharges, which are reversed in polarity relative to each other, in a direction orthogonal to the flow direction of the gas, and
wherein electric charges of reversed polarity are alternately imparted to the $SO_3$ mist and the dust, the gas is guided to the electrical field formation part without spraying a dielectric in the gas, and when the gas flows between the first electrode and the second electrode, the first electrode and the second electrode collect the $SO_3$ mist and the dust electrically charged by the corona discharges.

2. A wet-type electric dust collection device for removing low-concentration $SO_3$ mist and dust contained in a gas, the wet-type electric dust collection device comprising:
a first electrode and a second electrode that are arranged to oppose each other along a flow direction of the gas containing the $SO_3$ mist and the dust and form a DC electrical field; and
an electrical field formation part including a plurality of discharge portions that are arrayed and formed at predetermined intervals along the flow direction of the gas on opposing surfaces of the first electrode and the second electrode, and a high voltage power source,
wherein the discharge portions of the first electrode and the discharge portions of the second electrode alternately generate corona discharges, which are reversed in polarity relative to each other, in a direction orthogonal to the flow direction of the gas, and
wherein electric charges of reversed polarity are alternately imparted to the $SO_3$ mist and the dust, the gas is guided to the electrical field formation part without spraying a dielectric in the gas, and when the gas flows between the first electrode and the second electrode, the first electrode and the second electrode collect the $SO_3$ mist and the dust electrically charged by the corona discharges, and wet-type electric dust collection device further comprises a cleaning unit that is provided on a gas outlet side of the electrical field formation part and cleans the surfaces of the first electrode and the second electrode to which the $SO_3$ mist and the dust are adhered.

3. A dust removal method for removing low-concentration $SO_3$ mist and dust contained in a gas, the dust removal method comprising:

an electrical field formation step of forming, by using a high voltage power source, a DC electrical field between a first electrode and a second electrode that oppose each other;

a first gas introduction step of guiding the gas, containing the $SO_3$ mist and the dust that are not electrically charged and not having a dielectric sprayed therein, to between the first electrode and the second electrode in which the DC electrical field is formed;

a first electrical charging step of alternately generating corona discharges, which are reversed in polarity relative to each other, using the first electrode and the second electrode, in the DC electrical field, and alternately imparting electric charges of reversed polarity to the $SO_3$ mist and the dust through the corona discharges when the gas flows between the first electrode and the second electrode;

a first collection step of collecting the charged $SO_3$ mist and dust, using the first electrode and the second electrode; and a concentration acquisition step of acquiring the concentration of the $SO_3$ mist in the gas, wherein on the basis of the concentration of the $SO_3$ mist acquired in the concentration acquisition step, a first dust removal step including the first gas introduction step, the first electrical charging step, and the first collection step is carried out when the concentration of the $SO_3$ mist in the gas is equal to or less than a predetermined value which is 10 ppm, and a second dust removal step is carried out when the concentration of the $SO_3$ mist in the gas is greater than the predetermined value which is 10 ppm, and wherein the second dust removal step includes:

a preliminary electrical charging step of electrically charging the $SO_3$ mist and the dust in advance;

a spraying step of spraying a dielectric in the gas;

a second gas introduction step of guiding the charged $SO_3$ mist and dust and the dielectric to a location between the first electrode and the second electrode in which the DC electrical field is formed;

a second electrical charging step of alternately generating the corona discharges of reversed polarity in the DC electrical field, alternately imparting electric charges of reversed polarity to the $SO_3$ mist and the dust when the gas flows between the first electrode and the second electrode, alternately imparting electric charges of reversed polarity to the dielectric, and dielectrically polarizing the dielectric;

an adhesion step of adhering the $SO_3$ mist and the dust to the dielectric; and a second collection step of collecting the $SO_3$ mist, the dust, and the dielectric, using the electrodes.

4. A dust removal method for removing low-concentration $SO_3$ mist and dust contained in a gas, the dust removal method comprising:

an electrical field formation step of forming, by using a high voltage power source, a DC electrical field between a first electrode and a second electrode that oppose each other;

a first gas introduction step of guiding the gas, containing the $SO_3$ mist and the dust that are not electrically charged and not having a dielectric sprayed therein, to a location between the first electrode and the second electrode in which the DC electrical field is formed;

a first electrical charging step of alternately generating corona discharges, which are reversed in polarity relative to each other, using the first electrode and the second electrode, in the DC electrical field, and alternately imparting electric charges of reversed polarity to the $SO_3$ mist and the dust through the corona discharges when the gas flows between the first electrode and the second electrode;

a first collection step of collecting the charged $SO_3$ mist and dust, using the first electrode and the second electrode; and a cleaning step of cleaning and removing the $SO_3$ mist, the dust, and the dielectric that are adhered to the electrodes, from a gas outlet side.

5. The dust removal method of claim 3, further comprising using a control unit to control at least part of the method.

* * * * *